United States Patent [19]
Nilsson

[11] Patent Number: 4,723,769
[45] Date of Patent: Feb. 9, 1988

[54] WELDING BENCH

[76] Inventor: Nils R. Nilsson, Karossvägen 3, S-264 00 Klippan, Sweden

[21] Appl. No.: 908,451

[22] Filed: Sep. 17, 1986

Related U.S. Application Data

[63] Continuation of Ser. No. 803,449, Dec. 2, 1985, abandoned, which is a continuation of Ser. No. 655,261, Jul. 30, 1984, abandoned, which is a continuation of Ser. No. 391,011, Jun. 22, 1982, abandoned.

[51] Int. Cl.⁴ ............................................. B23Q 3/04
[52] U.S. Cl. ........................................ 269/58; 269/68; 269/71; 269/79
[58] Field of Search ............... 269/79, 71, 58, 68, 269/228; 108/51.1; 248/161, 411, 414

[56] References Cited

U.S. PATENT DOCUMENTS

| | | | |
|---|---|---|---|
| 1,180,951 | 4/1916 | Saper | 248/411 |
| 1,442,267 | 1/1923 | Gross et al. | 269/71 |
| 1,603,307 | 10/1926 | Anderson | 269/71 |
| 2,260,241 | 10/1941 | Bargen | 248/411 |
| 2,634,931 | 4/1953 | Weitzel | 108/51.1 |
| 3,567,068 | 3/1971 | Carfizzi | 108/51.1 |
| 3,917,249 | 11/1975 | Constantine | 269/71 |
| 4,387,886 | 6/1983 | Schlegel et al. | 269/71 |

Primary Examiner—Robert C. Watson
Attorney, Agent, or Firm—John R. Janes

[57] ABSTRACT

A welding bench has a base plate supporting a substantially vertical outer casing with a rectangular or square cross-section. Supported in the outer casing is an inner casing projecting out of the outer casing and vertically movable by means of a variable length device. Supported at the upper part of the inner casing and swingable in a horizontal plane is a supporting structure for a bench top. The bench top is by means of a horizontal joint swingably connected to the supporting structure thus permitting swinging of the bench top in relation to the supporting structure and location of the bench top in freely selected, inclined positions.

5 Claims, 8 Drawing Figures

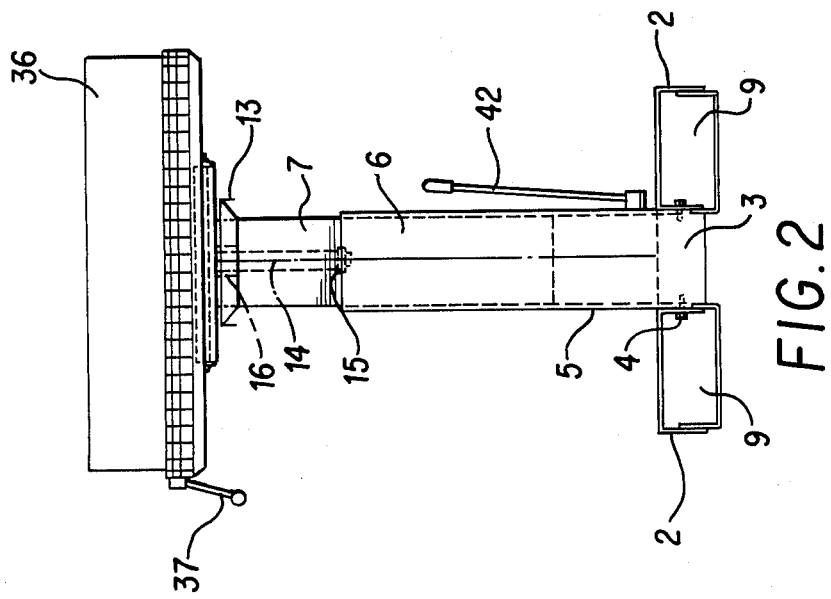
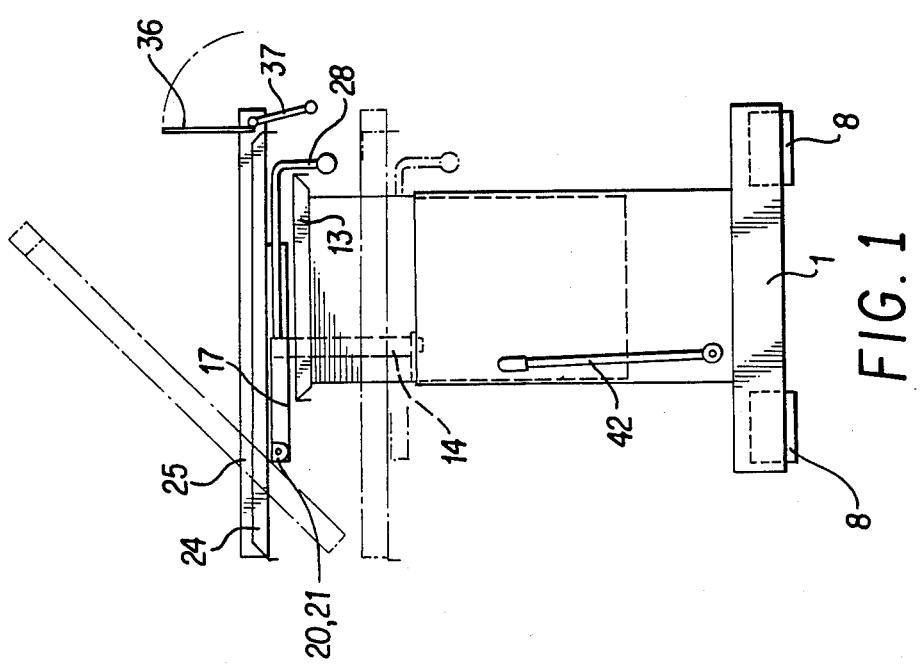

WELDING BENCH

This is a continuation of application Ser. No. 803,449, filed Dec. 2, 1985, which in turn is a continuation of Ser. No. 655,261, filed July 30, 1984, which in turn is a continuation of Ser. No. 391,011, filed June 22, 1982, all three now abandoned.

BACKGROUND OF THE INVENTION

1. Field of the Invention

The present invention relates to devices for supporting and locating workpieces while carrying out welding work thereon, hereinafter called welding benches. More particularly, this invention relates to small welding benches adapted for use during the production of prototypes or during welding work in repair workshops, industrial schools and during the manufacture of welded articles in small numbers.

2. Description of the Prior Art

Considerable development work has been carried out with regard to the location of workpieces and to facilitate the handling of welded units and the accessibility during the welding work. The aim of this development has, however, been mainly directed towads aids for use during large-scale manufacture and for handling heavy workpieces which must be supported in position adjusters or fixtures connected to lifting tackle.

During the production of prototypes or during welding work in repair workshops, industrial schools and during the manufacture of articles in small numbers, it has proved difficult to utilize the result of said development, interalia for reasons of cost. In order to facilitate welding work during small-scale manufacture and the production of prototypes of various kinds, a smaller type of welding benches has been developed, said welding benches comprising a bench top supported on a base plate by means of a column construction of the telescopic type being extendable and retractable in the vertical direction. In a known welding bench of this kind, disclosed in Swedish Pat. No. 78 03969-0, the bench top is pivotally supported at the upper end of a vertical, telescopic column construction, the vertical pivotal axis being disposed eccentrically in relation to said column construction. Thus, the bench top carrying a workpiece secured thereon can be brought into different positions in the vertical direction, and by swinging the bench top around the vertical pivotal axis also be adjusted into different angular positions in the horizontal plane in order to bring the workpiece into a suitable position for carrying out welding operation thereon.

Even if the known types of small welding benches referred to above, to a certain extent facilitate welding operations in the production of prototypes and in small scale manufacture, they only provide limited adjustment possibilities. Thus, when there is a need to bring a workpiece into an inclined position on the bench, the workpiece has to be blocked up. As the need of bringing the workpieces into an inclined position to facilitate welding operation is rather frequently occurring, the limited adjustment possibilities is a cumbersome disadvantage in known welding benches of the kind referred to. The relatively small dimensions of known welding benches referred to above would be expected to facilitate movement of the benches between different work places. Despite this said welding benches have proved relatively difficult to move with the aid of easily accessible auxiliary devices, and require permanently arranged lifting and transportation equipment for moving the benches from one working place to another.

The present invention, which relates to the type of welding benches used for small-scale manufacture and the production of prototypes, has as its object to overcome the disadvantages of the known welding benches and so to provide the working field in question with an improved aid which further facilitates welding work during the manufacture of individual products and small series. Another object of the invention is to provide an aid which improves the working conditions for the personnel carrying out the welding work by enabling improved working positions and direct changes between a sitting and standing working position.

Additional objects and advantages of the invention in part will be set forth in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein the improved welding bench of this invention has a substantially horizontal base plate; an outer casing with a rectangular or square cross-section projecting vertically upwards and rigidly connected to the base plate; an inner casing projecting upwards out of the outer casing in which it is movable vertically by means of a variable length device. the corner portions of said inner casing being in sliding cooperation with the internal corner portions of the outer casing; said inner casing carrying, at its upper end, a rotatable vertical shaft which is disposed eccentrically in relation to the cross-section of the inner casing, and said vertical shaft carrying at its upper end, a substantially horizontal supporting structure for a bench top for locating thereon articles intended for welding, the improvement comprising a horizontal joint which connects on end of the bench top to one end of the supporting structure permitting swinging of the bench top in relation to the supporting structure, and means for locating the bench top in a freely selected inclined position in relation to the supporting structure.

Preferably said means for locating the bench top in a freely selected inclined position comprise a stay articulately secured to the under side of the bench, the opposite end of said stay being adjustable into a plurality of locking positions formed on the supporting structure.

In a welding bench according to the invention wherein the corner portions of the inner casing are mutally connected to one another by means of plates bent inwards in a slight V-shape, it is preferred to connect said plates by means of longitudinally adjustable devices.

It is also preferred to provide the base plate of the welding bench with recesses, parallel with one another and permitting the insertion therein of forks of a fork lift truck or another lifting member provided with forks.

Preferably said base plate consists of two inverted U-shaped sheet-metal sections which are disposed paallel with one another and which are mutually connected to one another at their ends, and that at each of the ends of said inverted U-shaped sheet-metal sections and secured to the under side of said sheet-metal sections is a U-shaped supporting member, said supporting members together with said inverted U-shaped sheet-metal sections forming said recesses.

The accompanying drawings, which are incorporated in and constitute a part of this specification, illustrate embodiments of the invention and, together with the description, serve to explain the principles of the invention.

BRIEF DESCRIPTION OF THE DRAWINGS

Of the drawings:

FIG. 1 is a side view of the device according to the invention;

FIG. 2 is a front view of the device;

Figure 3:
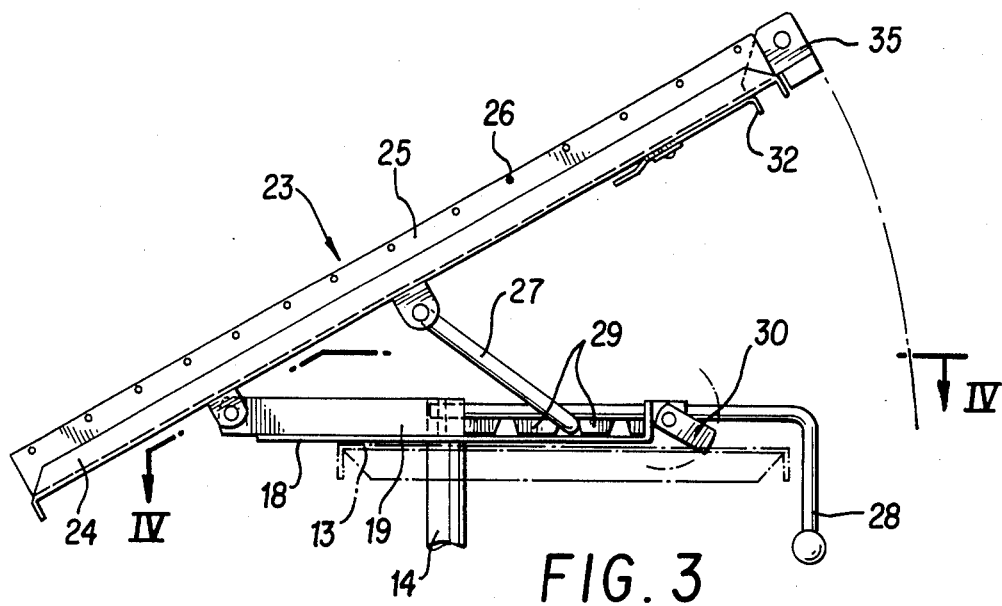
FIG. 3 is a side view of the bench top of the welding bench with the bench top in the tilted position.
Figure 4:
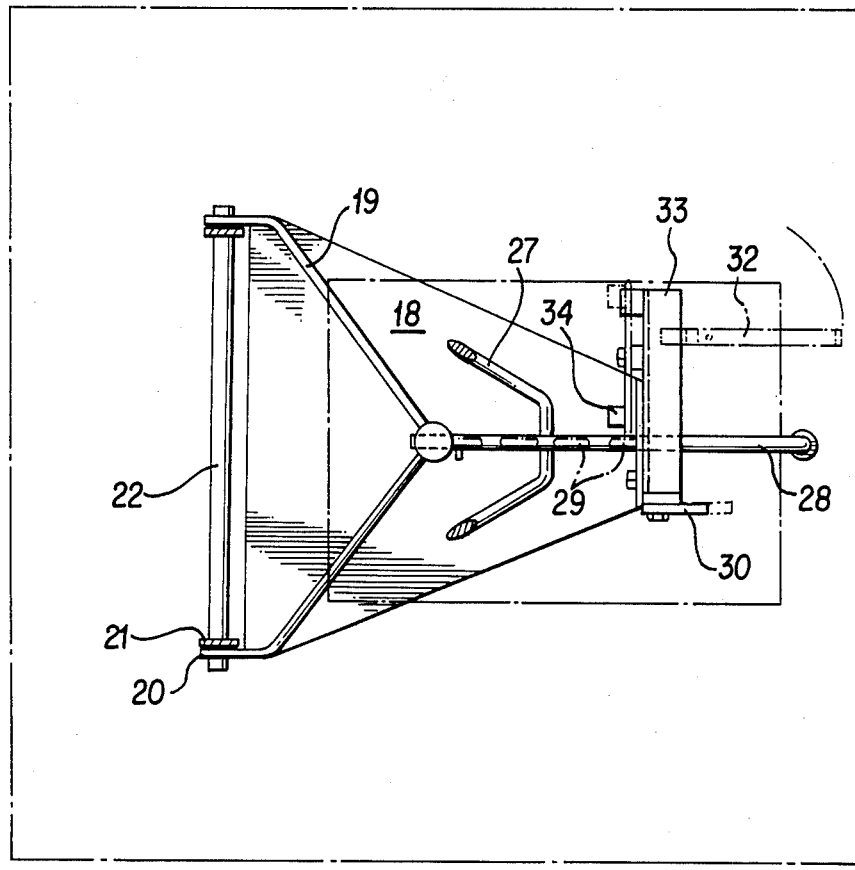
FIG. 4 illustrates the tilting mechanism seen from above.
Figure 5:
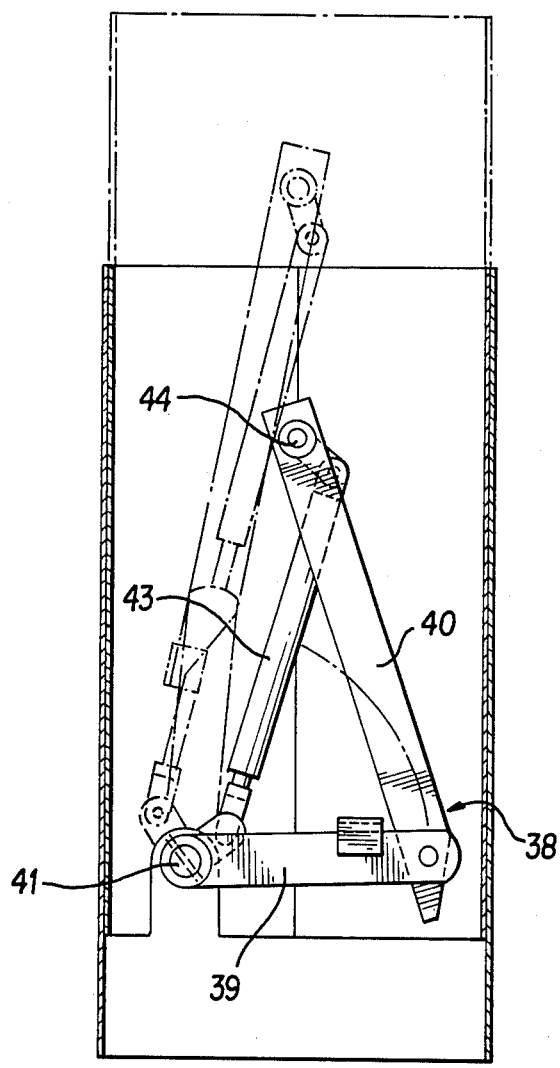
FIG. 5 is a side view of the lifting mechanism for the bench.
Figure 6:
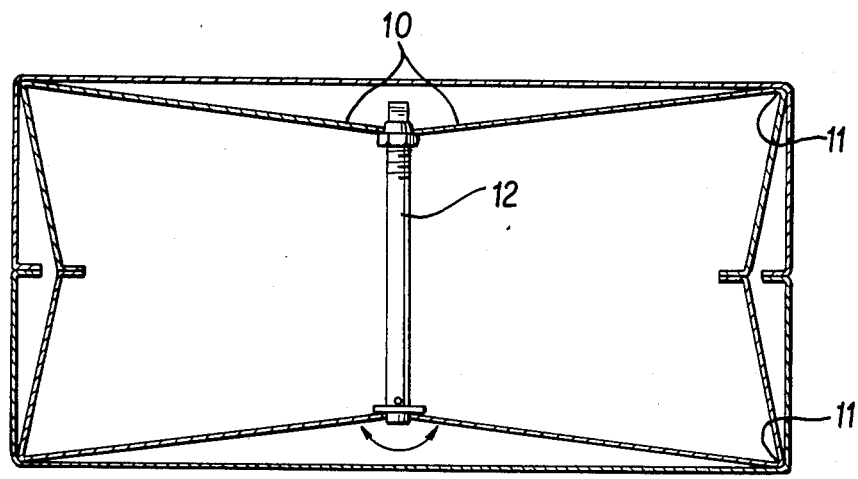
FIG. 6 is a horizontal section through the outer and inner casing of the column construction of the welding bench.
Figure 7:
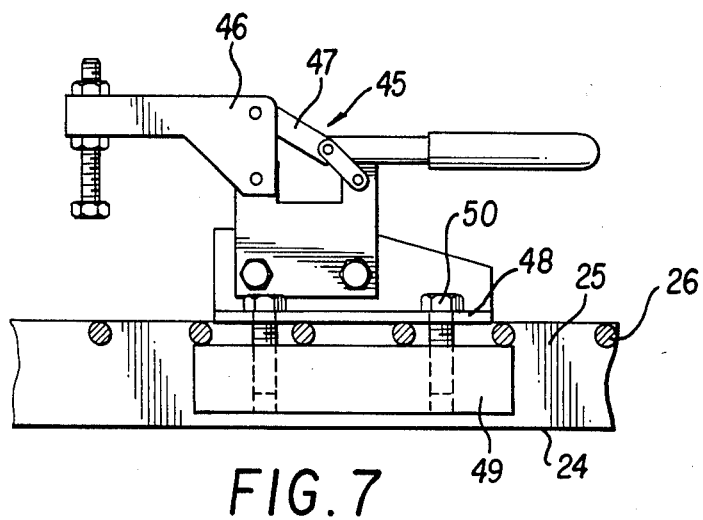
FIGS. 7 and 8 illustrate the principle for securing clamps, bosses or the like to the bench top.
Figure 8:
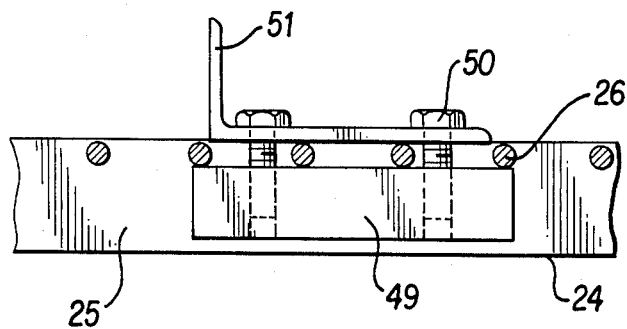

References will now be made in detail to the present preferred embodiments of the invention, an example of which is illustrated in the accompanying drawings.

DESCRIPTION OF THE PREFERRED EMBODIMENT

Referring now to FIGS. 1–8 the welding bench shown therein is supported on a substantially plane support consisting of a rectangular base plate 1 comprising two sheet-metal sections 2 of inverted U-shape which are disposed parallel and which are connected to one another transversely at their ends by means of inverted U-shaped connecting pieces 3. The sheet-metal sections 2 and the connecting pieces 3 form a rectangular base plate 1 with a rectangular opening in the middle of the plate for an outer casing 5 with a rectangular cross-section, secured therein by means of a bolt connection 4 and projecting vertically upwards. Thus the outer casing 5 together with the base plate 1 forms a base 6 for the steady support of an inner casing 7 which is guided for displacement in relation to the base 6 in the outer casing 5. The base plate is supported on the bed by four supporting members, 8 consisting of short U-shaped sheet-metal sections which, together with the inverted U-shaped sheet-metal sections 2 of the base plate 1, form recesses or "tunnels" 9, suitable for the introduction therein of the forks of a fork-lift truck or the like.

The inner casing 7 which, like the outer casing 5, is made of plane metal sheets, has a cross-section which differs from the rectangular shape as a result of the fact that opposite casing sides 10 (see FIG. 6) are bent inwards in a slight V-shape so that only the corners 11 are in sliding contact with corresponding corners in the outer casing 5. The opposite angle tips in the slightly angular long sides 10 of the inner casing 7 are connected to one another by means of a setscrew 12 with a nut, by means of which the distance between the angle tips can be varied and thus the dimension over the corners 11 of the inner casing 7 can be adjusted so that a suitable sliding grip is obtained between corners of the outer casing 5 and the inner casing 7. Such an adjustment may be required because of manufacturing tolerances and wear and to ensure a distinct guiding and low friction in the sliding grip of the casings.

The inner casing 7 is closed at its upper end by a cover plate 13 and carries a vertically disposed shaft 14 which is eccentric in relation to the cross-section of the casing and which is mounted for rotation in the inner casing 7 in a lower thrust and radial bearing 15 and an upper bearing bushing 16 which is disposed in the cover plate 13. The shaft 14 projects up above the cover plate 13 and carries a horizontal supporting structure 17 comprising a supporting plate 18 which, seen from above, (see FIG. 4) has the shape of a truncated triangle, the base of which projects outside the short side of the inner casing 7. Further secured to the base plate 18 are two flat bars 19 which are placed on edge and which extend outside the base plate 18 and form attachment lugs 20 for cooperation with two corresponding lugs 21 on the under side of the bench top 23 of the welding bench, and a shaft 22 which passes through the lugs 20, 21, together forming an articulated connection between the bench top 23 and the supporting structure 16 so that the bench top 23, by swinging about the articulated connection, can be caused to assume various inclined positions, for example as shown in FIG. 3 and as indicated in dashed line in FIG. 1.

The bench top 23 consists of a bottom plate 24, to the top of which there are secured a plurality of flat bars 25 set on edge and disposed with mutual spacing apart and with equal division. Secured at the same height as the upper edge of the flat bars 25, with equal mutual spacing, are a plurality of round bars 26 which are transverse in relation to the flat bars 25. Flexibly secured to the under side of the bottom plate 24 of the bench top 23 is a stay 27 for locating the inclined position of the bench top 23.

A control handle 28 extends outside the casing 7 from a transverse hole in the vertical shaft 14. By means of the control handle, the supporting structure 16 and hence the bench top 23, can be swung about the shaft 14. The control handle 28 is also rotatable about its own axis and is provided, at the under side, with a plurality of welded-on bosses 29 with a spacing between adjacent bosses corresponding to the thickness of the stay 27. Thus, by turning the control handle 28, the stay 27 can either be locked in a fixed position or be released so that the bench top can be swung into the desired inclined position. Further pivotally secured to the supporting plate 18 is a locking heel 30 which cooperates with a groove formed in the cover plate 13 to lock the supporting structure 17 and hence the bench top 23 in a specific alignment position in the horizontal plane. Further secured to the under side of the bench top is a lever 32 which is pivotable sideways and which cooperates with an angle fitting 33 on the supporting plate 16 to lock the bench top 22 in a horizontal position and to prevent upsetting of the bench top if unevenly loaded. The angle fitting 33 further carries a catch 34 which can be lowered and by means of which the control handle 25 is locked with the bosses 29 facing downwards in the locking position for the stay 27.

Secured to one side of the bench top 23 is the bearing lug 35 by means of which a lateral plane 36 can be locked in various angular positions in relation to the bench top 23 by means of a locking handle 37. As a result of the fact that the bearing lug 35 is slotted, the lateral plane 36 can be lifted off after the locking handle 37 has been released.

The raising and lowering of the welding bench is brought about by vertical displacement of the inner casing 7 in relation to the outer casing 5. The displacement movement is brought about by means of a variable-length device, the opposite ends of which are secured in the inner and outer casings respectively. In the embodiment shown in the Figures, the variable-length device consists of a link mechanism 38 with a lower link 39 and an upper link 40, articulately connected to one another. The lower link 39 is rigidly connected to a through shaft 41 which is mounted in the outer casing 5 and which is connected, outside the casing 5, to a lifting lever 42. The upper link 40 is articulately connected to the inner casing 7 so that on swinging of the lifting lever 42, its movement is converted into a vertical displacement movement of the inner casing 7. Secured between the links 39, 40 is a pneumatic spring 43 adapted to balance out the lifting forces to a certain extent when the bench 22 is lifted. As a result of securing the pneumatic spring 43 in attachment lugs secured at a suitable angle on the shaft 41 and the joint 44 respectively, an "over centre" lock is obtained when the bench top is completely lifted up. The links 39, 40 also cooperate with a catch provided on the link 39 to relieve the pneumatic spring from compressive forces when the bench top is in its upper position.

The securing to the bench top 23 of releasable clamping devices 45 which may consist of clamping members 46 operated by means of a link mechanism 47, or clamping of stop heels 51, is brought about by means of an upper attachment plate 48 and an attachment yoke 49 disposed below the round bars 26, and clamped together by means of screws 50. By a suitable selection of the spacing between the bolts 50 in relation to the spacing between the round bars 26, an infinitely variable possibility of adjustment is obtained for the clamping device 45 or the stop heels 51.

I claim:

1. A small welding bench suitable for use in industrial establishments and schools, and having a bench top that is adjustable in height, inclination and rotational position, comprising, in combination:
   (1) a substantially horizontal base support;
   (2) a welding bench top;
   (3) a telescopic height adjusting assembly for the bench top comprising:
      (a) an upstanding outer casing substantially rectangular or square in cross-section and having four corners, rigidly carried on the base support;
      (b) an upstanding inner casing having one end extending upwardly beyond the upper end of the outer casing and substantially rectangular or square in cross-section with four corners, telescopically mounted within the outer casing, the four corners thereof slidably engaging the four corners of the outer casing for telescopic movement therewithin; the inner casing having side portions bent inwardly, out from sliding engagement with the corresponding side portions of the outer casing;
      (c) adjusting means interconnecting two opposite sides of the inner casing for adjusting the spacing of the inwardly-bent side portions thereof;
   (4) an inclination-adjusting and rotational-adjusting assembly for the bench top comprising:
      (a) a supporting structure for the bench top pivotably mounted upon the upper end of the inner casing, for rotation and pivoting about a vertical axis of the inner casing, including means at one side of the bench top mounting the bench top to one side of the supporting structure for pivoting movement about a horizontal axis;
      (b) means for locating the bench top in a selected inclined position in relation to the supporting structure; and
   (5) means for manually and telescopically moving the inner casing and with it the bench top up and down, comprising:
      (a) first and second link means, each having first and second ends, the first end of the first link being connected to the inner casing, and the first end of the second link being connected to the second end of the first link.
      (b) means disposed outside the inner casing for manually operating the telescopic movement of the inner casing, and connected to the second end of the second link; and
      (c) a pneumatic balance spring interconnecting the first and second links.

2. A small welding bench according to claim 1 wherein the means 4(b) for locating the bench top in a selected inclined position comprises a stay articulatedly secured to the bench top at one end, and at the opposite end being adjustable into a plurality of locking positions formed on the supporting structure.

3. A small welding bench according to claim 1 in which the inner casing 3(b) supporting at its upper end a rotatable vertical shaft disposed eccentrically in relation to the vertical axis of the inner casing, the shaft at its upper end supporting the supporting structure 4(a) for the bench top.

4. A small welding bench according to claim 1 in which the base support (1) comprises recesses arranged in parallel and shaped to accept forks of a forklift truck or other lifting member.

5. A small welding bench according to claim 4 in which the base support (1) comprises a plate composed to two inverted U-shaped sheet metal sections disposed in parallel with one another, and connected to each other at one end by way of the plate, and a U-shaped supporting member secured to the underside of the inverted U-shaped sheet metal sections at each of the ends thereof, the supporting member together with the inverted U-shaped sheet metal sections forming the recesses.

* * * * *